United States Patent

Choate et al.

[15] 3,664,087
[45] May 23, 1972

[54] CONTAINER POSITIONING MACHINE

[72] Inventors: Wallace W. Choate; Norman A. Amendola, both of Rochester, N.Y.

[73] Assignee: Gerber Products Company, Fremont, Mich.

[22] Filed: July 15, 1970

[21] Appl. No.: 54,921

[52] U.S. Cl. ................................53/163, 53/245, 198/30, 214/6 H, 214/6 P
[51] Int. Cl. ................................B65b 5/10, B65b 35/30
[58] Field of Search..............53/61, 62, 159, 162, 163, 164, 53/245; 198/20, 22 R, 22 B, 30; 214/6 DK, 6 H, 6 P

[56] References Cited

UNITED STATES PATENTS

| 3,522,890 | 8/1970 | Birchall | 214/6 P |
| 3,201,912 | 8/1965 | Wozniak | 53/61 |
| 2,506,661 | 5/1950 | Busse | 53/163 X |
| 3,052,071 | 9/1962 | Copping | 53/62 |
| 2,571,790 | 10/1951 | Tomkins | 53/159 X |

Primary Examiner—Robert L. Spruill
Attorney—Townsend and Townsend

[57] ABSTRACT

A machine for placing a multiplicity of upright containers on a container support surface in a side-by-side relationship. A support structure defining a container passageway which has a discharge end communicating with the support surface. The support structure includes means for continuously moving and urging containers toward the passageway. Transport means are provided for moving containers through the passageway onto the support surface. Further means are for temporarily retaining the containers in the passageway to the support structure to enable the replacement of filled support surfaces.

12 Claims, 7 Drawing Figures

Patented May 23, 1972
3,664,087
4 Sheets-Sheet 1
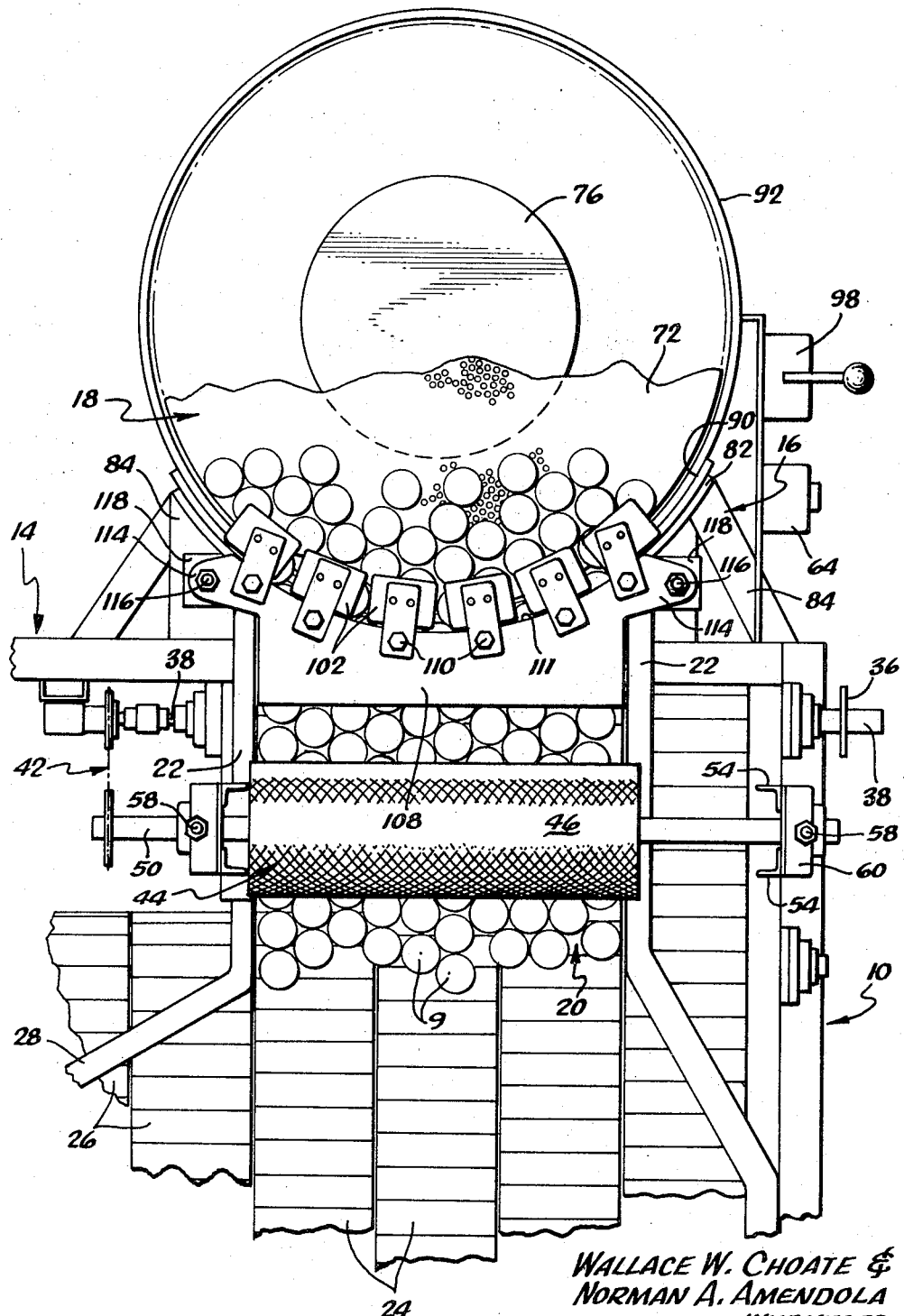
FIG_1
WALLACE W. CHOATE &
NORMAN A. AMENDOLA
INVENTORS
BY Townsend Townsend
ATTORNEYS Patented May 23, 1972
3,664,087
4 Sheets-Sheet 2
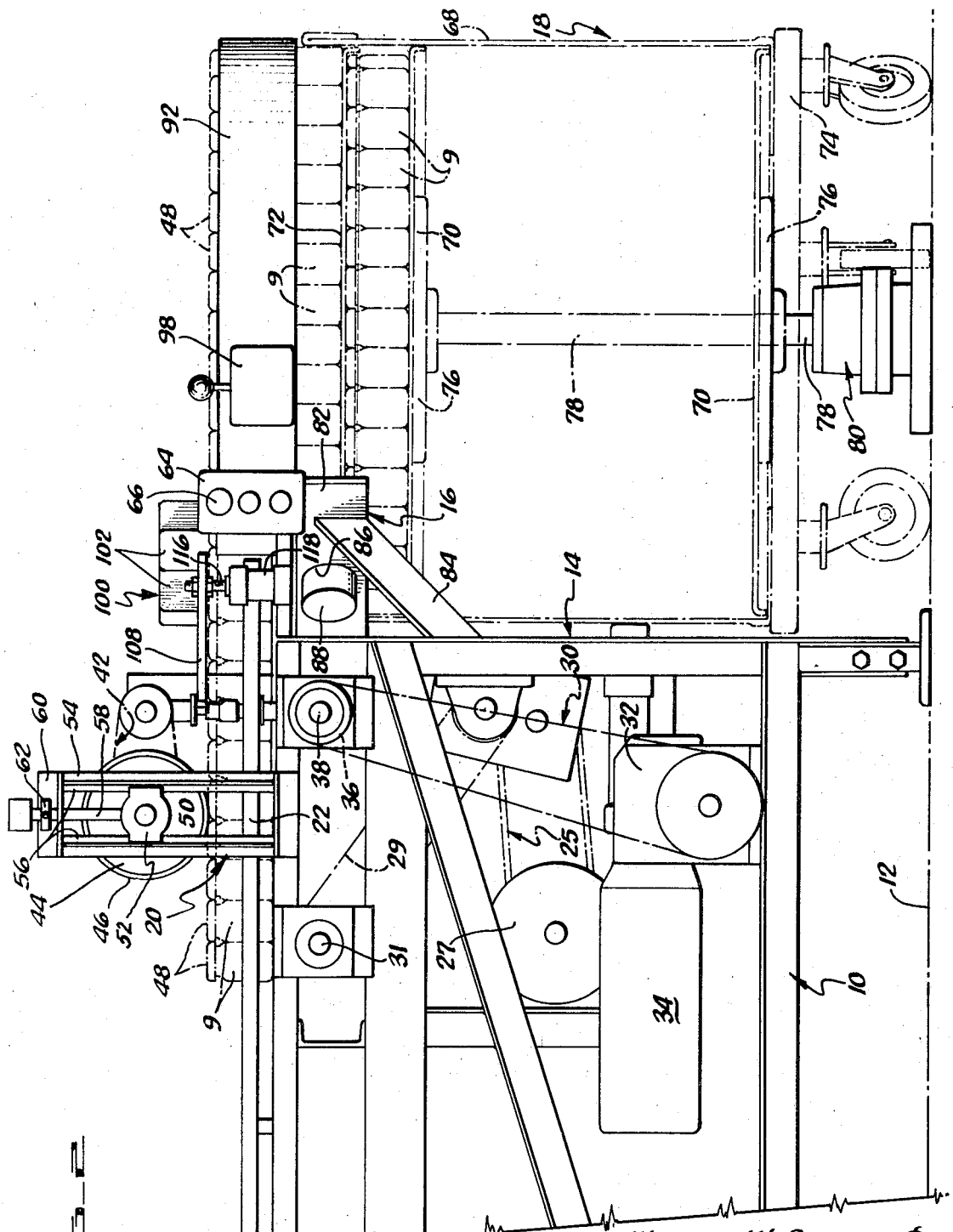
FIG_2
WALLACE W. CHOATE &
NORMAN A. AMENDOLA
INVENTORS
BY Townsend and Townsend
ATTORNEYS

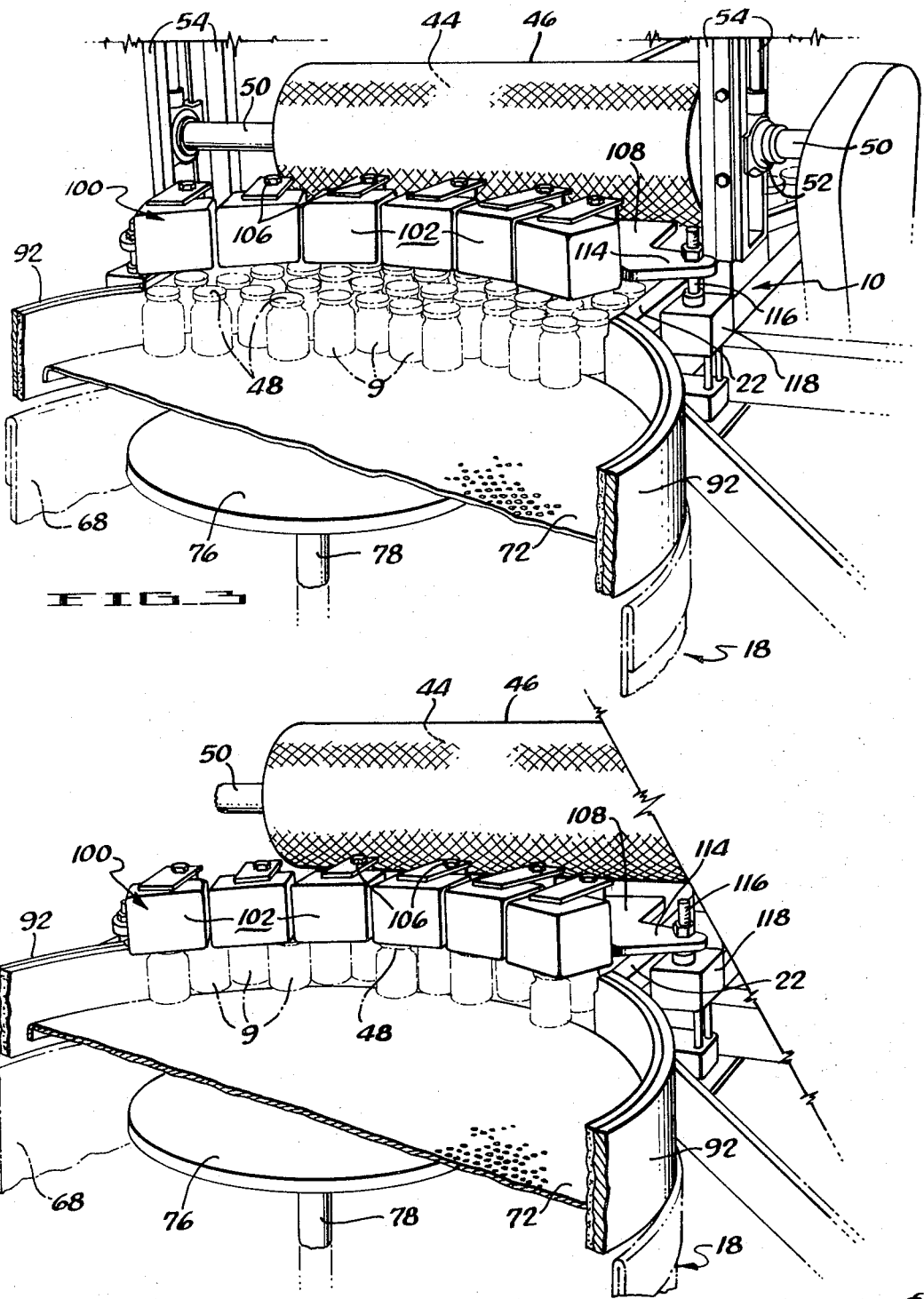

Patented May 23, 1972 3,664,087
4 Sheets-Sheet 4
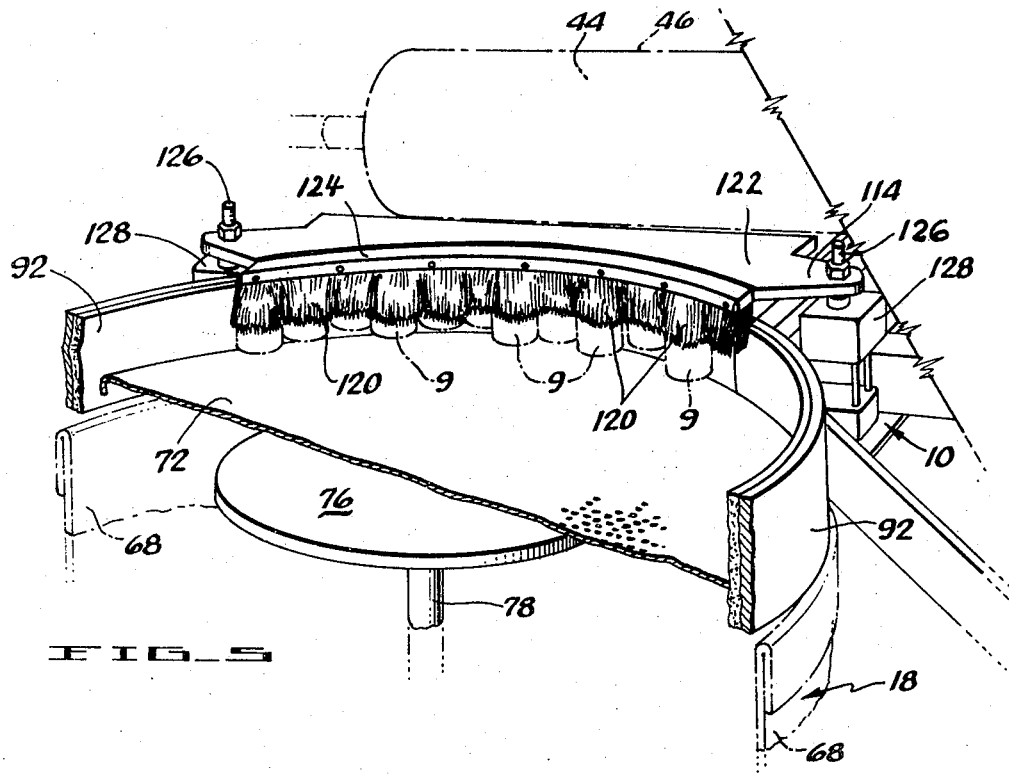
FIG_5
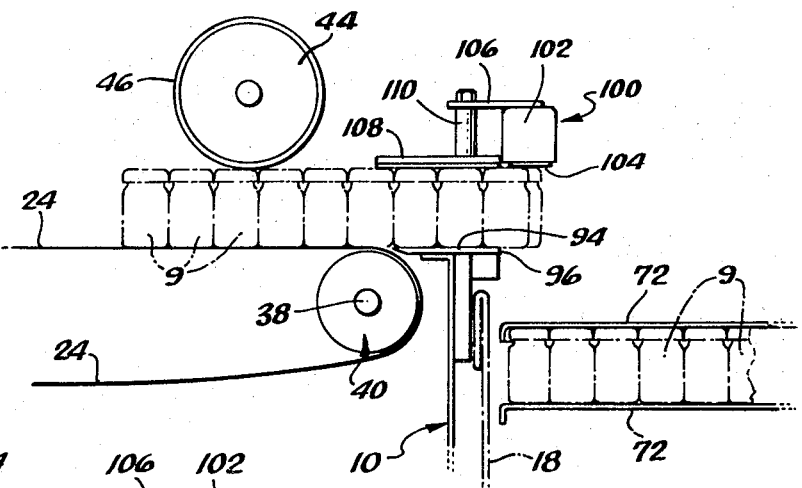
FIG_6
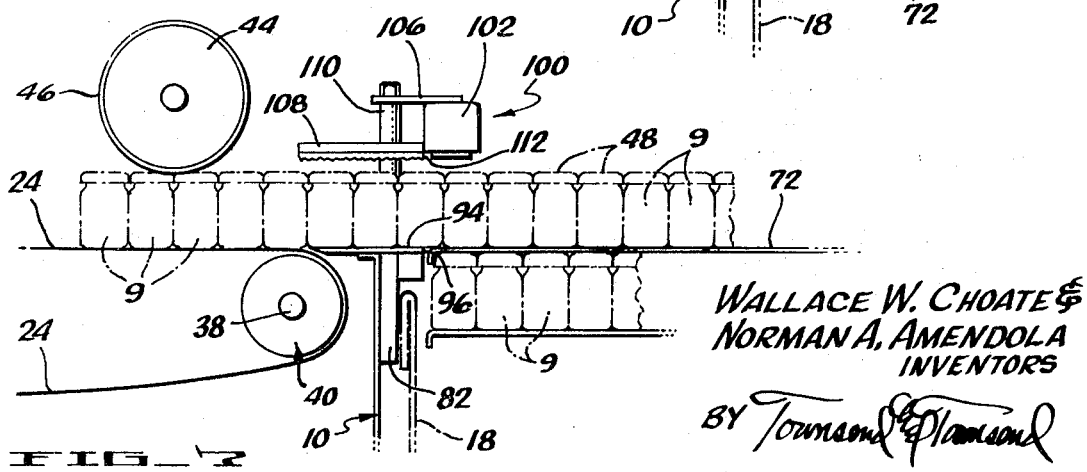
FIG_7
WALLACE W. CHOATE &
NORMAN A. AMENDOLA
INVENTORS
BY Townsend & Townsend
ATTORNEYS

CONTAINER POSITIONING MACHINE

BACKGROUND OF THE INVENTION

Industry, and not particularly the food industry, extensively employs glass, metallic, plastic and the like jars or containers into which their products are filled during one stage of the production process. These jars are then further handled. In the food industry, and particularly in the baby food industry, it is common to provide glass jars into which the food product, say strained fruit or vegetables, is filled. Thereafter the glass jar is closed with a metallic cover and a multiplicity of jars are positioned in an upright retort crate in multiple vertically stacked layers.

The high speed placement of the jars in the retort crates, in which the jar layers are separated by perforated thin plastic or metallic grates, has heretofore been largely a manual operation which is slow, time consuming and relatively expensive. A major problem which prevented the automatization of this production step was the difficulty of handling glass jars without breakage or damage when placing them in relatively deep crates.

SUMMARY OF THE INVENTION

The present invention provides apparatus for the loading of containers such as glass jars on container supporting surfaces of crates, boxes, pallets and the like in a fast and efficient manner. Briefly, the apparatus comprises a support structure, means mounted to the support structure and defining a container passageway terminating at the support surface, the structure including means positioning the support surface relative to the passageway, and container transport means disposed on the side of the passageway opposite the support surface. The transport means move the containers towards the passageway and permit relative motion between the containers and the transport means. Means independent of the transport means is further provided for intermittently moving containers through the passageway and onto the support surface.

In the preferred embodiment of the present invention the transport means and the intermittent moving means comprise side-by-side, elongate first and second belts, respectively. The passageway is aligned with the second belts which are intermittently actuated while the first belts are offset with respect to the passageway, are continuously driven, and bias newly incoming jars against guide means which direct such jars towards the passageway and the second belts. Stop means, such as electromagnets engaging ferrous jar caps, are further provided to retain jars which would project past the periphery of the support surface to the support structure to facilitate replacement of the support surface without subjecting the jars to tip-over, spillage or damage from contacting objects adjacent the periphery of the support surface.

While the magnets are actuated the second belts, which preferably cooperate with an overhead roller having a relatively soft exterior surface and which is rotated at a surface speed equal to the speed of the second belts, are de-energized. After a new container support surface is placed adjacent the passageway the electromagnets are de-energized and/or raised to clear the jars, the second belts and the roller are energized and the new support surface is filled with jars.

The present invention thus enables the high speed placement of jars on flat, substantially horizontal surfaces without the need of time consuming and relatively expensive hand labor. It is ideally suited for the above referred to loading of retort crates and the like.

In a retort crate, which has a depth many times greater than the height of the individual jars, the crate is provided with a false bottom and, when placed adjacent the container passageway of the apparatus, a vertically movable ram elevates the false bottom into horizontal alignment with the passageway. After the bottom has been fully filled with jars a perforated divider plate is placed on top of the jars and defines the next jar supporting surface. The ram is lowered to again horizontally align the new jar supporting surface with the jar passageway, the electromagnets are de-energized and the second belts and roller are actuated to fill the new supporting surface with jars. This process is repeated until the retort crate is full. Thereafter the crate is replaced with a new one.

In addition to significant cost savings the apparatus of the invention provides for the gentle handling of the jars. Thus, it is ideally suited for handling glass jars without unduly scraping, scuffing or otherwise damaging the jars. Rejections of finished processed jars due to poor appearance or damage are thereby substantially reduced to further enhance the cost savings in handling jars in accordance with the present invention.

BRIEF DESCRIPTION OF THE DRAWINGS

FIG. 1 is a fragmentary plan view of the container loading machine of the present invention;

FIG. 2 is a fragmentary side elevational view of the machine illustrated in FIG. 1;

FIG. 3 is a fragmentary front elevational perspective view, with parts broken away, illustrating the mouth of the container passageway when containers are being moved on the container support surface;

FIG. 4 is a view similar to FIG. 3 but illustrates the retention of containers to the machine to prevent their discharge onto the container supporting surface;

FIG. 5 is a fragmentary perspective front elevational view similar to FIG. 4 but illustrates another embodiment of the invention;

FIG. 6 is a schematic side elevational view and illustrates the container retention means in a retaining position; and FIG. 7 is a schematic side elevational view similar to FIG. 6 but shows the retention means in a releasing position permitting movement of the container onto the support surface.

DESCRIPTION OF THE PREFERRED EMBODIMENTS

Referring first to FIGS. 1 and 2, the loading machine of the present invention for containers such as glass jars 9 generally comprises a support structure 10 affixed to ground 12 and terminating in a forwardmost portion 14. A positioning device 16 for a retort crate 18 or the like projects from the forwardmost portion of the support structure and serves to align the crate with a jar passageway 20 defined by longitudinal side members 22 of the support structure and a plurality of endless, flat loading belts 24.

The loading belts extend a substantial length rearwardly of the passageway 20 (to the left of the passageway as viewed in FIG. 2). Laterally adjacent to loading belts 24 are a plurality of rearwardly extending, side-by-side flat transport belts 26. Drive means 25 comprising a motor 27 and a chain drive 29 engaging a sprocket (not separately shown) keyed to a shaft 31 which actuates drive wheels (not separately shown) for the transport belts is mounted on support structure 10 and continuously drives all the belts. Processed jars to be placed in crate 18 are deposited on transport belts 26 which move them in a forward direction until the jars contact sloping guide rails 28 that guide the jars transversely of the transport belts onto loading belts 24 and towards passageway 20. The transport belts 26 are constructed of a low friction material, such as stainless steel and preferably coated with a low friction coating such as teflon, so that a build-up of jars rearward of the passageway, which can temporarily prevent lateral movement of the jars onto the loading belts, results in slippage between the transport belts and the jar bottoms without generating excess pressure between the jars which can damage them and/or pop them off the transport or the loading belts.

Loading belts 24 are intermittently driven via a chain drive 30, reduction gear 32 and drive motor 34. Chain drive 30 includes a sprocket 36 keyed to a transverse shaft 38 which carries suitable drive rollers 40 (illustrated in FIGS. 6 and 7 only) over which the loading belts are looped. The end of drive shaft 38 opposite sprocket 36 includes a second chain drive 42 for rotating a pressure roller 44 extending across the width of passageway 20.

Pressure roller 44 is preferably constructed of a hollow, cylindrical core provided with a relatively soft, high friction coating such as a plastic or rubber sleeve 46. The core is constructed so that the total weight of the pressure roller establishes firm contact between jar caps 48 and the rubber sleeve without damaging the caps or the jars. The pressure roller is keyed to a shaft 50 driven by chain drive 42 and is journaled in bearings 52 horizontally positioned between a pair of spaced apart, upright posts 54. The posts include protrusions 56 which engage suitable grooves (not separately shown) in bearing blocks 52 and thus permit vertical movements of the blocks over the length of the protrusions and the posts. A suspension bar 58 is secured to each bearing block 52 and extends upwardly through apertures (not separately shown) of a generally horizontally disposed yoke 60 interconnecting each pair of bearing posts 54. An adjustable collar 62 is affixed to suspension bar 58 on the side of yoke 60 opposite from bearing blocks 52 and limits the extent to which the bearing blocks and pressure roller can move downwardly towards loading belts 24. The upward movement of the pressure roller is limited by the engagement of bearing blocks 52 with yokes 60. Chain drive 42, preferably a roller chain drive, includes excess chain length to accommodate the length variations of the drive due to the vertical movement of the bearing blocks 52 and pressure roller shaft 50. It will now be apparent that the weight of pressure roller 44, shaft 50, bearing blocks 52 and suspension bars 58 bias rubber sleeve 46 with a given force against jar caps 48.

Upon actuation of chain drive motor 34 loading belts 24 move the jars towards and past the passageway 20. Pressure roller 44, is of a diameter so that its peripheral speed equals the speed of advancement of the loading belts to provide for a positive drive of the jars through the passageway. The vertical movability of the pressure roller prevents damage to the rubber sleeve and/or to jars 9 or jar caps 48 should foreign objects become lodged between the jars and the loading belts or the pressure roller. Smooth, trouble-free feeding of the jars through passageway 20 is thus assured.

Controls 64 are provided to intermittently actuate loading belts 24 and pressure roller 44 by energizing chain drive motor 34 or, preferably, by energizing and de-energizing chain drive 30 via a suitable electrically actuated clutch and brake (not separately illustrated) for the chain drive. Such devices are known and, therefore, not further described herein. Preferably, the control is positioned adjacent passageway 20 and includes a push button 66 for the quick actuation and de-actuation of chain drive 30.

In one application of this invention the jar loading machine is employed for filling relatively deep retort crates. Such a crate is illustrated in FIG. 2 and comprises a perforated outer shell 68 provided with a false bottom 70 that can be raised from a lowermost position (illustrated in FIG. 2) beyond the upper end of the perforated shell. The crate is packed with jars by substantially completely filling the false bottom with jars, as illustrated in FIG. 2, and thereafter placing a perforated divider 72 on top of the jars supported by false bottom 70 to form a support surface for another layer of jars. Simultaneously therewith, the false bottom is lowered a distance corresponding to the height of jars 9 each time an additional jar layer is placed on top of it until it arrives at its lowermost position, i.e., whereupon the crate is filled. For greater handling convenience the retort crate is placed on a suitable dolly 74 to enable the quick placement of a crate in positioning device 16 and its quick withdrawal therefrom after the crate has been filled with jars.

For the raising and lowering of the false bottom in the above described manner the present invention provides a vertically movable, hydraulically actuated table 76 that is disposed on the uppermost end of a hydraulic ram 78 and secured to prevent any tipping or rocking of false bottom 70 that could hinder the flow of jars thereon from passageway 20. The hydraulic ram is conventionally mounted in a hydraulic cylinder assembly 80 mounted to ground 12 and so positioned with respect to positioning device 16 that the table is substantially concentric with false bottom 70 when crate 18 is disposed in positioning device 16.

The positioning device comprises a circularly arcuate bar segment 82 which is centered with respect to passageway 20 and connected to support structure 10 by suitable braces 84. The upper edge of the bar segment is positioned just below the horizontal plane of loading belts 24 and the upper end of crate 18 is received within the height of the bar segment. The bar segment further includes a pair of apertures 86 disposed on each side of passageway 20 into which electromagnets 88 are fitted. The magnets protrude to side 90 of the segment facing crate 18 and are electrically connected for energization and de-energization. When a ferrous crate 18 is disposed in the positioning device and the electromagnets are energized they firmly retain crate shell 68 to bar segment 82 and thus prevent relative movements of the crated during the jar loading step.

A circularly shaped retainer ring 92 having an inner diameter equal to the inner diameter of crate shell 68 is secured to bar segment 82, extends upwardly from the horizontal plane of loading belts 24 and retains jars being discharged from passageway 20 on false bottom 70 or a divider 72. The lower edge of the retainer ring is raised sufficiently high above ground 12 to enable the free movement of dolly mounted crates towards and from the positioning device. The retainer ring further has a sufficient height so that it embraces a major portion of the height of jars 9 to prevent jars from tipping over and falling off the false bottom or a divider when subjected to a horizontal force. That portion of the retainer ring which would extend across passageway 20 is deleted to provide for the discharge of the jars from the passage.

Referring now briefly to FIGS. 6 and 7, a stationary, horizontally disposed plate 94 is mounted to support structure 10 in horizontal alignment with loading belts 24 to provide a sliding surface for jars 9 moving through passageway 20 between the end of the loading belts and divider 72. A forward end 96 of the plate has a circularly arcuate configuration and a diameter about equal to the inner diameter of crate shell 68. Furthermore, the forward end of the plate is so shaped and positioned that it is substantially aligned with crate 18 retained to positioning device 16 so that there exists a continuous sliding surface for the jars from the loading belts via plate 94 and to divider 72.

During the loading of jars on a jar support surface of crate 18 loading belts 24 and pressure roller 44 continuously urge containers through passageway 20 until the support surface is completely filled with jars. Thereafter a hydraulic hand valve 98 is actuated to lower table 76 and another divider 72 is placed on top of the jars for the loading of another jar layer. Upon lowering of the table those jars which are not substantially fully inside the periphery of the inside diameter of crate shell 68 engage the top end of shell 68 and cannot move downwardly with the remainder of the jars. Unless retained to the support structure and prevented from being lowered such jars would tip over and break during the downward movement of hydraulic table 76 and/or prevent the placement of a new divider 72 on top of the perviously deposited jars until such misaligned jars are removed. This involves substantial time losses and additional labor by the machine operator.

To eliminate this problem the present invention provides stop or retaining means 100 which retain to the support structure those jars that extend past the inside diameter of crate shell 68. When a jar support surface, say a divider 72, is filled with jars the stop means is energized before the filled divider is lowered. Aside from the retention of the outwardly extending jars the stop means prevents forward movement of the jars in the passageway. When continuously moving transport belts 26 are employed, as is presently preferred in advancing a continuous flow of processed jars towards passageway 20, the stop means temporarily halts the forward motion of the jars until another jar support surface in the crate is ready.

Referring now to FIGS. 1 through 4, 6 and 7, stop means 100 comprises a plurality of electromagnets 102 arranged across the mouth of passageway 20. The underside of each electromagnet includes pole plates 104 for grasping ferrous jar caps 48 when the magnets are energized. Each magnet includes a rearwardly extending mounting bracket 106 and is secured to a clamp plate 108 with mounting bolts 110. The clamp plate is spaced above plate 94 and also includes a circularly arcuate front end 112 concentric with the center of crate 18. The clamp plate includes a pair of lateral ears 114 which are bolted to a ram 116 of a pneumatic actuator 118. The actuator is so positioned and sized that retraction of ram 116 results in contact or near contact between pole plates 104 of magnets 102 and the ferrous jar caps 48. When ram 116 is in its extended position the pole plates are spaced a substantial distance from the jar caps so that energization of magnets 102 does not result in the grasping of the caps by the pole plates.

The electromagnets, and particularly pole plates 104 are so positioned with respect to the interior of crate shell 68 and arcuate front end 111 of clamp plate 108 that energization of the electromagnets when rams 116 are in their retracted position results in the adherence of all jars that extend beyond the inside crate shell diameter. Thus, the electromagnets extends some distance inward of the inner crate shell diameter, as best seen in FIG. 1, to provide for a sufficient contact surface between the jar caps and the pole plates for adherence of the caps and the jars to the magnets.

Electromagnets 102 are wired for actuation and de-actuation via controls 64 and push button 66. Thus, while push button 66 is depressed and loading belts 24 and pressure roller 44 transport jars through the passageway onto the jar support surface located in positioning device 16 the magnets are de-energized and a solenoid (not separately shown) is set to extend pneumatic ram 116 and place clamp plate 108 in its raised position. Release of the push button de-activates the loading belts and pressure roller and lowers clamp plate 108 until pole plates 104 of magnets 102 contact container caps 48. Simultaneously therewith, the magnets are energized to retain the jars to the pole plates. Upon actuation of control valve 98 to lower hydraulic table 76 for placing another layer of jars in crate 18 those jars which could not lower due to their interference with edge 96 of plate 94 above walls of core shell 68 are prevented from tipping over.

The lowered clamp plate 108 and the contact between the top of jar 9 and a soft, resiliant, high friction material 112 on the underside of the clamp plate prevent transport belts 26, which exert a continuous biasing force on the jar, from pushing jars through passageway 20 while another jar support surface or divider is placed in crate 18 or while the crate is replaced with an empty one. The weight of the clamp plate, the magnets and the actuary ram for the plate, and the soft liner 112 establish sufficient friction to retain the jars to passageway 20 while jars forward of the clamp plate are retained by the energized electromagnets. To continue the filling of the crates actuators 118 are energized to raise clamp plate 108 while the electromagnets are de-energized to release the jars retained to them so that the jars can flow freely past passageway 20 onto crate 18.

Referring now to FIG. 5, in another embodiment of the present invention, for use with jars having jar caps constructed of a non-ferrous material such as plastic, the jar retaining electromagnets are replaced with flexible, resilient members such as bristles 120 secured to a holding bar 124 suitably mounted to support structure 10. The bristles extend vertically downward of the holding bar below the top of jars 9 so that they are positioned radially inward of the inner walls of crate shell 68. The bristles are of intermediate hardness so that the transport belts and roller 44 can push jars past the bristles onto crate 18 wherein clamp plate 122 is raised and does not contact the jar tops. Clamp plate 122 is mounted to rams 126 of pneumatic actuators 128 for the raising and lowering of the plate so that it can be brought into contact with the jar tops for retaining the jars in the passageway and preventing discharge of jars onto the crate. When the rams are retracted clamp platen 122 stops the flow of jars onto the crate and bristles 120 engage those jars which protrude just beyond the end of plate 94 (not shown in FIG. 5) to retain such jars to the passageway. Jars which would tip over upon the lowering of the jar supporting surface, even though constructed of non-ferrous, non-magnetic materials only, are thus retained to the loading machine. Breakage, close attention of the operator and hand labor to assure a continuing crate loading operation are thus substantially reduced or eliminated.

We claim:

1. Apparatus for the controlled placement of containers having ferrous caps on a removable surface comprising: means defining a passage terminating at said surface, means for feeding containers through said passage onto said surface, temporarily magnetizable stop means arranged across the width of the passage for magnetically engaging said caps and positively retaining containers in said passage to prevent further movement of containers onto the surface when said surface is removed from adjacent the passage, and means for selectively raising the magnetizable means.

2. Apparatus according to claim 1 wherein the containers comprise upright vessels and the feed means comprises means engaging a bottom and a top of the vessel and moving the bottom and the top at like speeds towards the surface.

3. Apparatus according to claim 2 including means applying a constant vessel-engaging force to the engaging means.

4. Apparatus for stacking a multiplicity of containers in a crate having a substantially cylindrical shell, comprising: a support structure defining a container passage having a substantially horizontal container supporting surface and terminating in a circular arcuate mouth, means having an axially movable, substantially horizontal, circular-shaped crate surface for placing the crate adjacent the mouth so that the crate surface is aligned with the mouth of the container supporting surface, means for slidably moving the containers through the passage towards the mouth and onto the crate surface, and circularly arcuately arranged stop means positioned across the width of the mouth for grasping containers that protrude past a cylindrical inside wall of said shell to prevent such containers from contacting objects adjacent the crate surface periphery.

5. Apparatus according to claim 4 wherein the crate is substantially higher than the containers for the placement of a plurality of container layers in the crate, and including means for raising and lowering the crate surface for the placement of multiple, vertically stacked container layers in the crate.

6. Apparatus according to claim 4 wherein the means for moving the container through the passage comprises a rotatable roller driven at a constant rate, means biasing the roller into contact with the containers, and means maintaining the force constant to prevent damage to the containers and the roll from irregularities in the container configurations and foreign objects accidentally entering between the roller and the containers.

7. Apparatus according to claim 4 wherein the stop means comprises a substantially vertically disposed resilient member depending from above the containers in the passageway to below tops of the containers, and means supporting the resilient member across the width of the passage mouth for temporarily engaging and retaining containers extending substantially beyond the periphery of the crate surface.

8. Apparatus according to claim 4 including means for releasably retaining the crate adjacent to and aligned with the passage mouth.

9. A container loading apparatus for fitting a multiplicity of rigid, upright containers on a container storage surface for the subsequent handling of the containers while on that surface, the apparatus comprising: a support structure, means mounted to the support structure and defining a container passageway terminating at the support surface, the support structure including means positioning the support surface relative to the passageway, container transport means disposed on the side of the passageway opposite the support surface for transporting the containers towards the passageway and permitting relative motion between the containers and the transport means, means independent of the transport means intermittently moving containers through the passageway and onto the support surface, said transport means and the intermittent means comprising side-by-side, first and second elongate belt means, wherein the passageway is disposed on a side of the support structure in alignment with the second belt means, and includes guide means for deflecting containers moving towards the passageway from the first belt means onto the second belt means, and means mounted to the support structure for constraining containers on the support surface.

10. Apparatus according to claim 9 wherein the intermittent means further includes a roller disposed across the passageway above the second belt means, the roller having a relatively high friction surface, means rotating the roller at a surface speed equal to the surface speed of the second belt means, and means permitting free upward movement of the roller to provide for the accommodation of off-size containers and foreign objects between the containers and the roll without damaging the containers and the roll.

11. Apparatus according to claim 9 including means for lowering the support surface and the containers thereon beneath the container constraining means.

12. A container loading apparatus for fitting a multiplicity of rigid, upright containers closed with ferrous caps, on a container storage surface for the subsequent handling of the containers while on that surface, the apparatus comprising: a support structure, means mounted to the support structure and defining a container passageway terminating at the support surface, the support structure including means positioning the support surface relative to the passageway, container transport means disposed on the side of the passageway opposite the support surface for transporting the containers towards the passageway and permitting relative motion between the containers and the transport means, means independent of the transport means intermittently moving containers through the passageway and onto the support surface, electromagnets positioned across the width of said passageways for constraining containers on the support surface, and means for lowering the electromagnets to retain caps of containers extending substantially past the periphery of the support surface in contact with the electromagnets and thereby prevent spillage, tip-over and damage to such jars.

* * * * *